United States Patent [19]
Kimura et al.

[11] Patent Number: 5,390,566
[45] Date of Patent: Feb. 21, 1995

[54] APPARATUS FOR CONTROLLING HYDRAULIC COUPLING DEVICE IN AUTOMATIC TRANSMISSION FOR MOTOR VEHICLE

[75] Inventors: Hiromichi Kimura, Okazaki; Hidehiro Oba, Aichi; Kunihiro Iwatsuki, Toyota, all of Japan

[73] Assignee: Toyota Jidosha Kabushiki Kaisha, Toyota, Japan

[21] Appl. No.: 956,172

[22] Filed: Oct. 6, 1992

[30] Foreign Application Priority Data

Oct. 8, 1991 [JP] Japan .................................. 3-289122

[51] Int. Cl.6 .............................................. B60K 41/06
[52] U.S. Cl. ................................. 477/161; 364/424.1
[58] Field of Search ......................... 74/866; 364/424.1

[56] References Cited
U.S. PATENT DOCUMENTS

| 4,855,913 | 8/1989 | Brekkestran et al. | 74/866 X |
| 4,928,557 | 5/1990 | Takada et al. | |
| 5,043,892 | 8/1991 | Brekkestran et al. | 364/424.1 OR |
| 5,088,354 | 2/1992 | Asada | 74/866 OR |
| 5,097,726 | 3/1992 | Asada | 74/866 OR |
| 5,101,350 | 3/1992 | Tokoro | 74/866 X |
| 5,109,731 | 5/1992 | Iwatsuki et al. | 74/866 OR |
| 5,166,879 | 11/1992 | Greene et al. | 364/424.1 OR |
| 5,182,970 | 2/1993 | Goto et al. | 74/866 OR |

FOREIGN PATENT DOCUMENTS

56-115819  9/1981  Japan .
63-291738 11/1988  Japan .
1-150056   6/1989  Japan .

Primary Examiner—Leslie A. Braun
Assistant Examiner—Daniel Wittels
Attorney, Agent, or Firm—Oblon, Spivak, McClelland, Maier & Neustadt

[57] ABSTRACT

A control apparatus for controlling a hydraulic pressure to be applied to a hydraulic operated frictional coupling device of an automatic transmission for a motor vehicle, for an engaging action of the coupling device to establish a given operating position of the transmission. The apparatus includes a detector for detecting a rate of change in a parameter indicative of a progress of the engaging action of the frictional coupling device, and a pressure control device for regulating the hydraulic pressure so that the rate of change in the parameter detected by the detector coincides with a target value. The apparatus further includes an inhibiting device. The execution of a vehicle control function which influences the detected rate of change in the parameter is inhibited by the inhibiting device, while the rate of change in the parameter is detected by the detector.

16 Claims, 7 Drawing Sheets

| | C1 | C2 | C0 | B0 | B1 | B2 | B3 | 2ND PLANETARY GEAR ASSEMBLY 18 | 1ST TRANSMISSION ASSEMBLY 16 |
|---|---|---|---|---|---|---|---|---|---|
| 1ST | ○ | | ○ | | | | | L | 1ST GEAR |
| 2ND | ○ | | ○ | | | ○ | | L | 2ND GEAR |
| 3RD | ○ | ○ | ○ | | | ○ | | L | 3RD GEAR |
| O/D | ○ | ○ | | ○ | | ○ | | H | 3RD GEAR |
| REV | | ○ | ○ | | | | ○ | L | REVERSE |

APPARATUS FOR CONTROLLING HYDRAULIC COUPLING DEVICE IN AUTOMATIC TRANSMISSION FOR MOTOR VEHICLE

BACKGROUND OF THE INVENTION

1. Field of the Invention

The present invention relates generally to a shift control apparatus for an automatic transmission of a motor vehicle, and more particularly to a technique for improving stability of controlling a rotating speed of a rotary member of such vehicle automatic transmission during an initial period of a shifting action of the transmission such that a rate of change in the speed of the rotary member coincides with a target value.

2. Discussion of the Prior Art

For a motor vehicle, there is available an automatic transmission having a plurality of hydraulically operated frictional coupling devices, which cooperate to selectively establish one of a plurality of operating positions (speed positions or gear positions) of the transmission. For controlling this type of automatic transmission, a shift control apparatus is known, for controlling the hydraulic pressure applied to each frictional coupling device during an engaging action thereof. This control apparatus is equipped with detecting means for detecting a rate of change of a certain parameter indicative of a progress or condition of a shifting action of the transmission. For example, the parameter may be a rotating speed or torque of a rotary member of the transmission, which speed or torque changes while the transmission is shifted. The hydraulic pressure of the frictional coupling device under control is controlled so that the detected rate of change of the parameter coincides with or nears a desired or target value. An example of such shift control apparatus is disclosed in U.S. Pat. No. 4,928,557 to Takada et al, wherein a rate of change $d\omega_T$ of the rotating speed of clutch C0 during an initial period of a shifting action of the transmission is detected, so that the hydraulic pressure of the frictional coupling device is electronically controlled such that the detected rate of change $d\omega_T$ coincides with the target value. The hydraulic pressure thus determined and used for an engaging action of the frictional coupling device is stored and used for a subsequent engaging action of the coupling device. For example, when the transmission is shifted from a first-speed position to a second-speed position, the duty cycle of a solenoid-operated control valve for regulating the back pressure of an accumulator for engaging brake B2 for establishing the second-speed position is calculated based on the detected rate of change $d\omega_T$ and the target value $d\omega_{T0}$, and the duty cycle used for the last engaging action of the brake B2.

In the known shift control apparatus indicated above, the parameter which indicates the progress of a shifting action of the automatic transmission, namely, an engaging action of a frictional coupling device, may be influenced by other control functions for controlling the vehicle, for instance, a suction control operation when the vehicle is provided with a so-called ACIS (Automatic Control Induction System) control function for controlling a suction control valve of an inertia supercharging engine, and a traction control operation when the vehicle is provided with a so-called TRC (Traction Control System) control function for controlling the drive force of drive wheels when the vehicle is started or accelerated. Described more particularly, if such control functions are effected while the rate of change in the above-indicated parameter is being detected, the detected value of the parameter will fluctuate and deviate from the true value. Consequently, the regulation of the hydraulic pressure of the frictional coupling devices on the basis of the detected rate of change of the parameter may cause varying or inconsistent shifting characteristic of the transmission, upon different shifting actions of the transmission, giving an uncomfortable feel to the vehicle driver. Where the vehicle has the ACIS control function, the suction control valve provided in the air intake line is opened and closed so as to maximize the engine output, depending upon whether or not the throttle valve opening is larger than a predetermined threshold and whether or not the engine speed is lower than a predetermined threshold. The opening and closing actions of this suction control valve will result in changing the speed and output torque of the engine, and thereby influencing the detected rate of change in the above-indicated parameter used for controlling the transmission. Where the vehicle has the TRC control function, the throttle valve opening, ignition timing and fuel injection amount of the engine are controlled so as to hold the slip ratio of the vehicle drive wheels within an optimum range. In this case, too, the engine speed and output torque are changed, giving an influence on the detected rate of change in the parameter.

SUMMARY OF THE INVENTION

It is therefore an object of this invention to provide a control apparatus for controlling frictional coupling devices of an automatic transmission of a motor vehicle, on the basis of a detected rate of change in a parameter indicative of a progress of a shifting action of the transmission, which apparatus assures consistent shifting characteristic of the transmission, even when the vehicle has a control function which influences the detected rate of change in the above-indicated parameter.

The above object may be achieved according to the principle of the present invention, which provides a control apparatus for controlling a hydraulic pressure to be applied to a hydraulic operated frictional coupling device of an automatic transmission for a motor vehicle, for an engaging action of the coupling device to establish a given operating position of the transmission, the control apparatus comprising: (a) detector means for detecting a rate of change in a parameter indicative of a progress of the engaging action of the frictional coupling device; (b) pressure control means for regulating the hydraulic pressure so that the rate of change in the parameter detected by the detector means changes towards a target value; and (c) inhibiting means for inhibiting execution of a control function of controlling the vehicle, while the detector means is detecting the rate of change in the parameter, the execution of the control function influencing the detected rate of change in the parameter.

In the control apparatus of the present invention constructed as described above, the inhibiting means inhibits the execution of any vehicle control function which influences the detected rate of change in the parameter, as long as the rate of change in the parameter is being detected by the detector means. This arrangement prevents an error or noise which would otherwise be included in the detected rate of change due to the execution of the vehicle control function.

Accordingly, the present control apparatus eliminates a deviation or fluctuation of the rate of change in the parameter as detected by the detector means, which indicates the progress of the shifting action of the automatic transmission, namely, the engaging action of the frictional coupling device of the transmission. Therefore, the control apparatus assures improved stability in regulating the hydraulic pressure to be applied to the frictional coupling device, on the basis of the detected rate of change in the parameter, and permits high consistency in the shifting characteristic or behavior of the automatic transmission, and enhanced shifting smoothness of the transmission as felt by the vehicle driver.

BRIEF DESCRIPTION OF THE DRAWINGS

The above and other objects, features and advantages of the present invention will be better understood by reading the following detailed description of a presently preferred embodiment of the invention, when considered in connection with the accompanying drawings, in which.

DETAILED DESCRIPTION OF THE INVENTION

Figure 1:
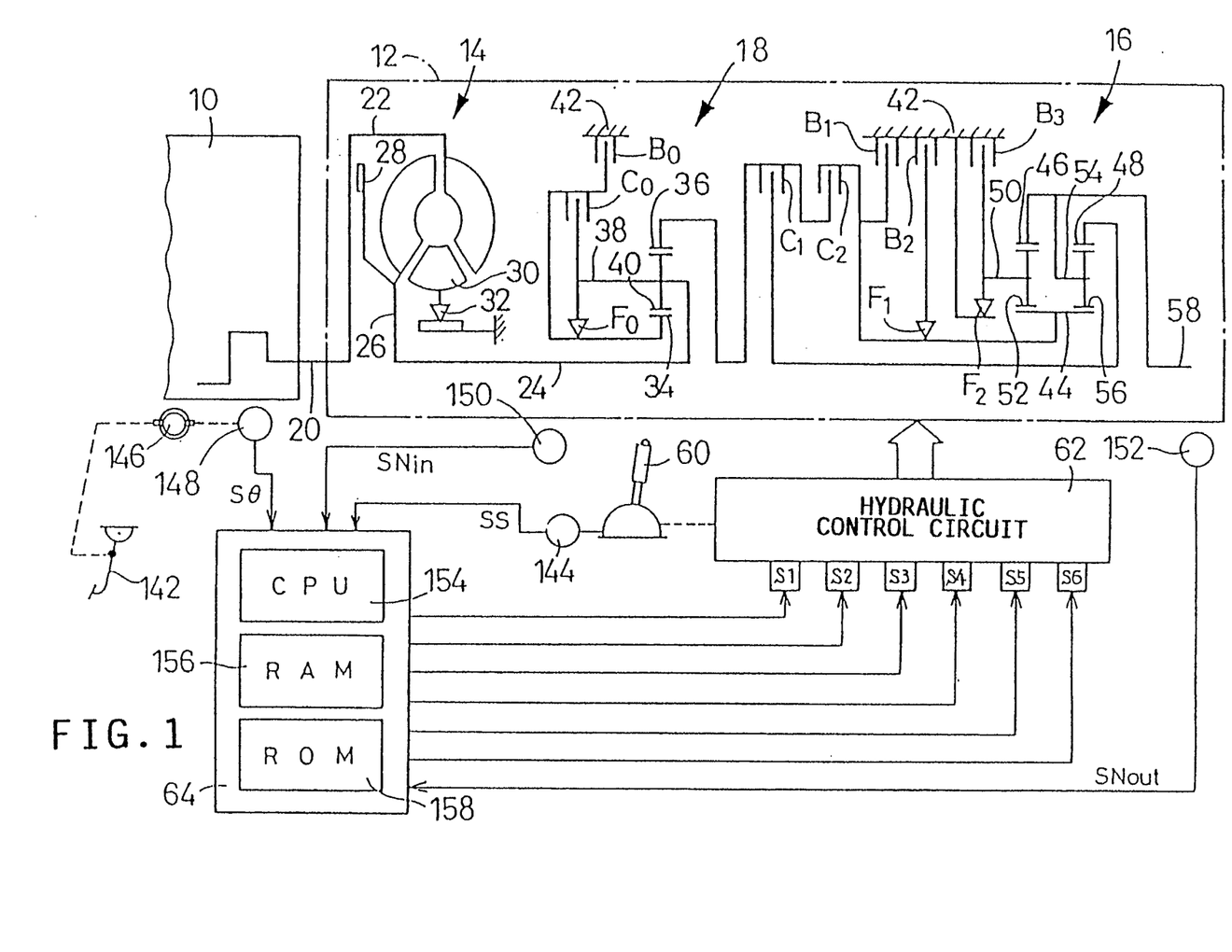
FIG. 1 is a schematic view of an automatic transmission of a motor vehicle equipped with one embodiment of a shift control apparatus of the present invention.

Referring first to FIG. 1, there are shown a power transmitting system of an automotive vehicle, and a control system for controlling the vehicle. The vehicle has an engine 10, and a hydraulically operated automatic transmission 12 connected to the engine 10 through a crankshaft 20. The power of the engine 10 is transmitted to drive wheels of the vehicle through the transmission 12, a differential gear device and other components of the transmitting system. The control system incorporates a shift control apparatus constructed according to one embodiment of the present invention.

The automatic transmission 12, which is shown in a block of one-dot chain line in FIG. 1, includes a torque converter 14, a first planetary gear assembly 16 and a second planetary gear assembly 18 interposed between the torque converter 14 and the first planetary gear assembly 16. The torque converter 14 has: a pump impeller 22 connected to the crankshaft 20; a turbine impeller 26 connected to an input shaft 24 of the second planetary gear assembly 18; a lock-up clutch 28 for directly connecting the pump and turbine impellers 22, 26; a stator 30; and a one-way clutch 32 for permitting the rotation of the stator 30 in one direction.

The second planetary gear assembly 18 incorporates a planetary gear set which includes a sun gear 34, a ring gear 36, a carrier 38, and a planetary gear 40 which is rotatably supported by the carrier 38 and which meshes with the sun gear 34 and ring gear 36. Between the sun gear and ring gear 34, 36, there are disposed in parallel a clutch C0 and a one-way clutch F0. A brake B0 is disposed between the sun gear 34 and a housing 42 of the transmission 12.

In the second planetary gear assembly 18, the ring gear 36 serves as an output member which is rotated at one of two speeds, i.e., low (L) or high (H) speed, depending upon whether the clutch C0 or brake B0 is in the engaged state. Thus, the speed of the input shaft 24 is changed in two steps at the ring gear 36. When the one-way clutch F0 provided between the sun gear 34 and the carrier 38 is in the engaged state, a rotary motion of the input shaft 24 is transmitted to the sun gear 34 even if the clutch C0 is in the released or disengaged state, when the power is transmitted from the engine 10 towards an output shaft 58 of the transmission 12.

The first planetary gear assembly 16 incorporates a composite type planetary gear unit which includes a common sun gear 44, a pair of ring gears 46, 48, a carrier 50, a planetary gear 52 rotatably supported by the carrier 50 and meshing with the sun and ring gears 44, 46, a carrier 54, a planetary gear 56 rotatably supported by the carrier 54 and meshing with the sun and ring gears 44, 48. In the first planetary gear assembly 16, a clutch C1 is disposed between the ring gear 48 and the ring gear 36 of the first planetary gear assembly 18, and a clutch C2 is disposed between the ring gear 36 and the sun gear 44. Further, a brake B1 and a series connection of a one-way clutch F1 and a brake B2 are disposed in parallel between the sun gear 44 and the housing 42, while a brake B3 and a one-way clutch F2 are disposed in parallel between the carrier 50 and the housing 42. The ring gear 46 and the carrier 54 are integral with the output shaft 58 of the transmission 12. With the clutches C1, C2 and brakes B1, B2 and B3 being selectively engaged, the first planetary gear assembly 16 provides three forward drive positions, and one rear drive position, as described below.

Figure 2:
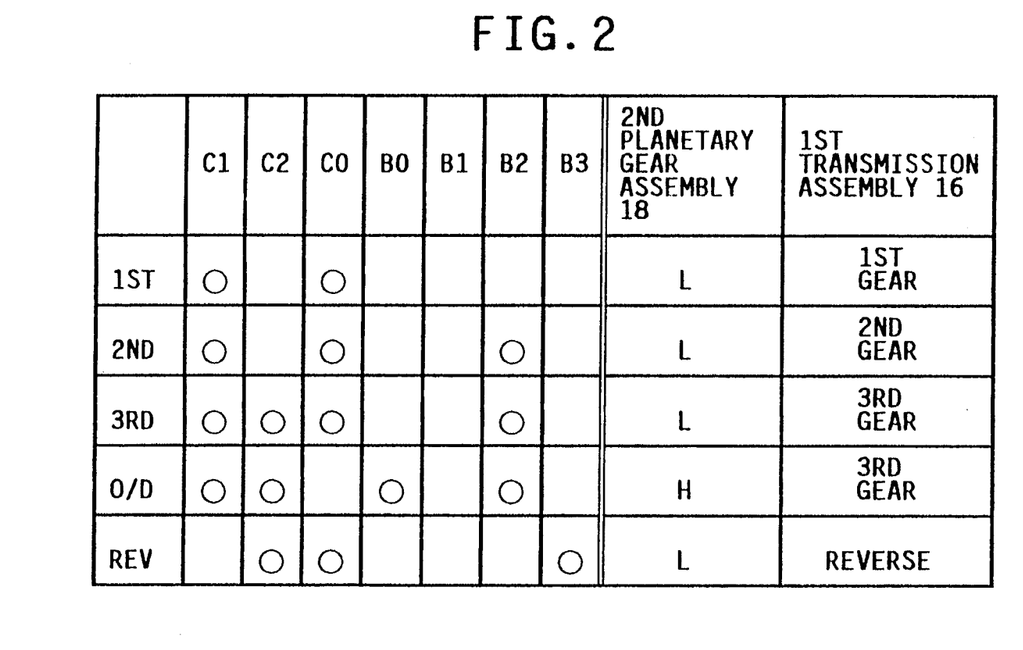
FIG. 2 is a view indicating the operating states of frictional coupling devices of the transmission, in relation to different operating positions of the transmission.

Each of the clutches C0, C1, C2 and brakes B0, B1, B2 and B3 is a hydraulically operated frictional coupling device, which consists of a plurality of friction plates or bands, and a hydraulic actuator for frictional contact or coupling of the friction plates or bands, as well known in the art. In the present embodiment, the automatic transmission 12 has four operating positions: 1st-speed position; 2nd-speed position; 3rd-speed position; overdrive position (O/D); and reverse position (Rev.), as indicated in FIG. 2. These operating positions of the transmission 12 are established by the corresponding combinations of the clutches and brakes C0–C2 and B0–B3, which are selectively placed in the engaged or operated state as indicated by "o" marks in FIG. 2. The vehicle is provided with a shift lever 60 which is linked with a so-called manual valve (shift lever valve) provided in a hydraulic control circuit 62. When the shift lever 60 or manual valve is operated to a NEUTRAL position (N) or a PARKING position (P), all of the clutches and brakes C0–C2 and B0–B3 are released or disengaged. When the shift lever 60 is operated to a REVERSE position (R), the clutches C0 and C2 and the brake B3 are engaged, so as to establish the reverse position (Rev.) of the transmission 12. When the shift lever 60 is operated to a DRIVE (D) position, the transmission 12 is automatically shifted to a suitable one of the four forward drive positions: 1st-speed; 2nd-speed; 3rd-speed; and overdrive, with the frictional coupling devices C0–C2 and B0–B3 controlled by an electronic controller 64.

The hydraulic control circuit 62 is provided with six solenoid-operated control valves S1, S2, S3, S4, S5 and S6, which are controlled by shift commands from the controller 64. The control valves S1 and S2 control first and second shift valves (not shown), respectively, for controlling the first planetary gear assembly 16, while the control valve S3 controls a third shift valve (not shown) for controlling the second planetary gear assembly 18. The control valve S4 controls a lock-up relay valve (not shown) for engaging or releasing the lock-up clutch 28. The control valve S5 is a linear solenoid valve for controlling a line pressure regulating valve (not shown). The control valve S6 is a solenoid-operated shut-off valve for controlling the back pressure of an accumulator 72 for regulating the hydraulic pressure applied to the brake B2, as indicated in FIG. 3.

There will be described an operation of the controller 64 as a shift control apparatus constructed according to the principle of the present invention, which is performed when the transmission 12 is shifted from the 1st-speed position to the 2nd-speed position, by way of example. It will be understood from FIG. 2 that the 1st-speed position is changed to the 2nd-speed position, by operating the brake 2 to the engaged position. As shown in FIG. 3, the brake B2 is operated by a pressurized fluid supplied from the accumulator 72 provided in the hydraulic control circuit 62. The hydraulic pressure $Pb_2$ applied to the brake B2 is regulated by regulating the back pressure PA of the accumulator 72.

Figure 3:
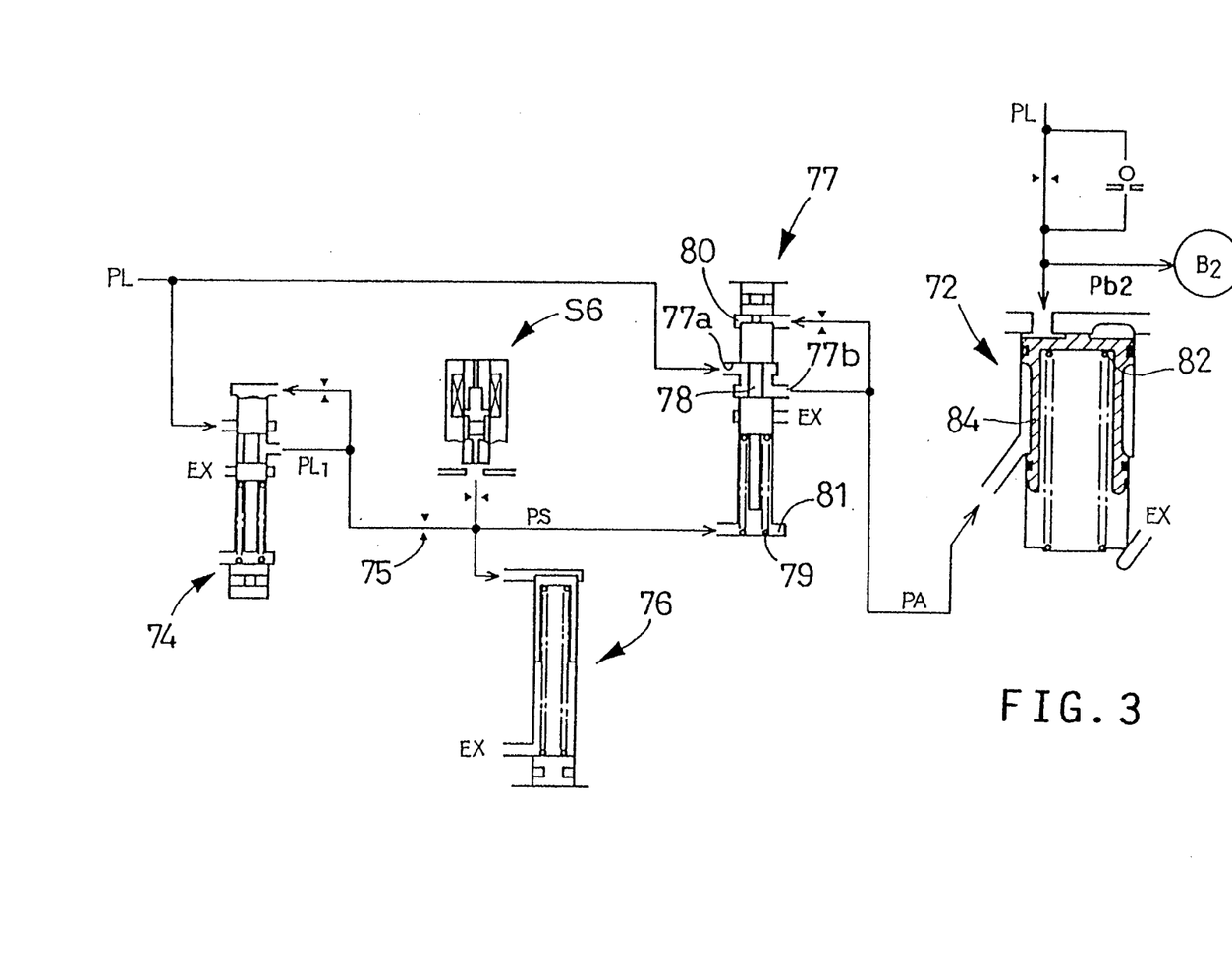
FIG. 3 is a view showing a part of a hydraulic control circuit for the transmission.

Described in detail referring to FIG. 3, the normally-open type solenoid-operated shut-off valve S6 is turned on and off with a controlled duty cycle DSSD1 under the control of the controller 64, so as to regulate the back pressure PA of the accumulator 72, for thereby controlling the hydraulic pressure $Pb_2$ applied to the brake B2. The hydraulic control circuit 62 incorporates a modulator valve 74, which functions to regulate a system line pressure PL to a modulated pressure PLy, which is applied to the shut-off valve S6 through a flow restrictor 75. With the shut-off valve S6 operated with the controlled duty cycle DSSD1, the modulated pressure $PL_1$ is lowered to a duty-controlled pressure PS, by partially draining the fluid through the shut-off valve S6 downstream of the restrictor 75. The duty-controlled pressure PS, which is determined by the duty cycle DSSD1 of the shut-off valve S6, is applied to an accumulator control valve 77. A hydraulic damper 76 is connected to the shut-off valve S6, at a point downstream of the restrictor 75, for the purpose of absorbing pressure pulsation which takes place due to the repeated energization and de-energization of the solenoid of the shut-off valve S6 with the controlled duty cycle DSSD1. The accumulator control valve 77 has: an input port 77a receiving the line pressure PL; an output port 77b from which the back pressure PA is generated; a valve spool 78 movable between an open position for fluid communication between the input and output ports 77a, 77b, and a closed position for disconnecting these ports 77a, 77b from each other; a spring 79 for biasing the valve spool 78 toward the closed position; a feedback chamber 80 which receives the back pressure PA to bias the valve spool 78 toward the open position; and a fluid chamber 81 which receives the duty-controlled pressure PS to bias the valve spool 78 toward the closed position. The accumulator control valve 77 is operated to generate the controlled back pressure PA, which increases with a decrease in the duty-controlled pressure PS. The accumulator 72 has a piston 84 which is biased by a spring 82 and which receives the back pressure PA. The accumulator 72 functions to lower a rate of rise of the hydraulic pressure $Pb_2$ applied to the brake B2, depending upon the biasing force of the spring 82 and the back pressure PA which act on the piston 84.

The currently selected position of the shift lever 60 is detected by a shift position sensor 144, which applies a SHIFT POSITION signal SS to the electronic controller 64. A throttle valve 146 is provided in an intake pipe of the engine 10. The opening angle $\theta$ of the throttle valve 146 changes with an amount of operation of an accelerator pedal 142, and is detected by a throttle sensor 148, which applies a THROTTLE signal $S\theta$ to the controller 64. Further, speed sensors 150 and 152 are provided to detect the rotating speeds Nin and Nout of the clutch C0 and output shaft 58, respectively. These speed sensors 150, 152 generate INPUT SPEED signal SNin and OUTPUT SPEED signal SNout, which are also applied to the controller 64.

The controller 64 is a so-called microcomputer, which incorporates a central processing unit (CPU) 154, a random-access memory (RAM) 156, a read-only memory (ROM) 158, and interface circuits, as well known in the art. The CPU 154 operates to control the solenoid-operated control valves S1–S6, based on the received signals, and according to control programs stored in the ROM 158, while utilizing a temporary data storage function of the RAM 156. For instance, the controller 64 selects the suitable one of the operating positions of the transmission 12, on the basis of the vehicle speed (calculated from the OUTPUT SPEED signal SNout) and the opening angle r of the throttle valve 148 (calculated from the THROTTLE signal $S\theta$), and according to predetermined shift patterns stored in the ROM 158. The selected operating position of the transmission 12 is established by applying appropriate commands to the solenoid-operated control valves S1, S2 and S3. Further, the controller 64 controls the solenoid-operated control valve S4 to control the operation of the lock-up clutch 28, on the basis of the detected vehicle speed and throttle opening angle $\theta$, and according to a predetermined relationship stored in the ROM 158. The controller 64 also operates to control the linear solenoid valve S5 so that the valve S5 applies a controlled pilot pressure Ps to the line pressure regulating valve, for regulating the line pressure PL. The pilot pressure Ps continuously changes with the throttle opening angle $\theta$.

No further description on the manners of controlling the control valve S1–S5 will be provided, since detailed description thereof is not necessary for understanding the principle of the present invention, which relates to the control valve S6 for regulating the back pressure PA of the accumulator 72 for controlling a rise of the hydraulic pressure $Pb_2$ to be applied to the brake B2.

Figure 7:
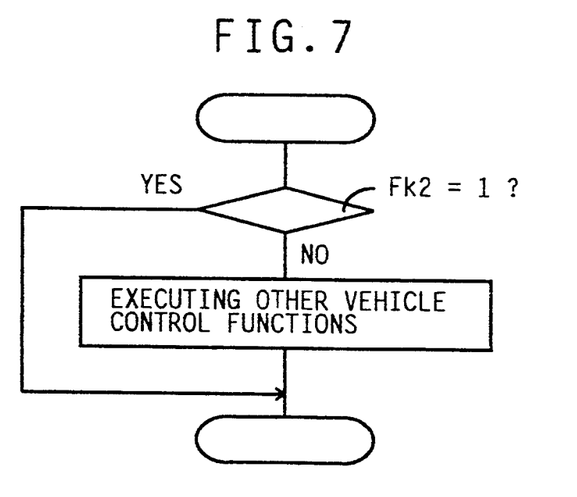
FIG. 7 is a flow chart illustrating a control routine executed by the controller for effecting the vehicle control functions.

Referring to the flow charts of FIGS. 4, 5 and 7, there will be described respectively a control routine for determining the duty cycle DSSD1 of the control valve S6, a control routine for making determination as to whether the execution of specific vehicle control functions influencing the control of the duty cycle DSSD1 or back pressure PA is permitted or inhibited, and a control routine for executing the specific vehicle control functions. These control routines may be performed either in series or in parallel.

Figure 4:
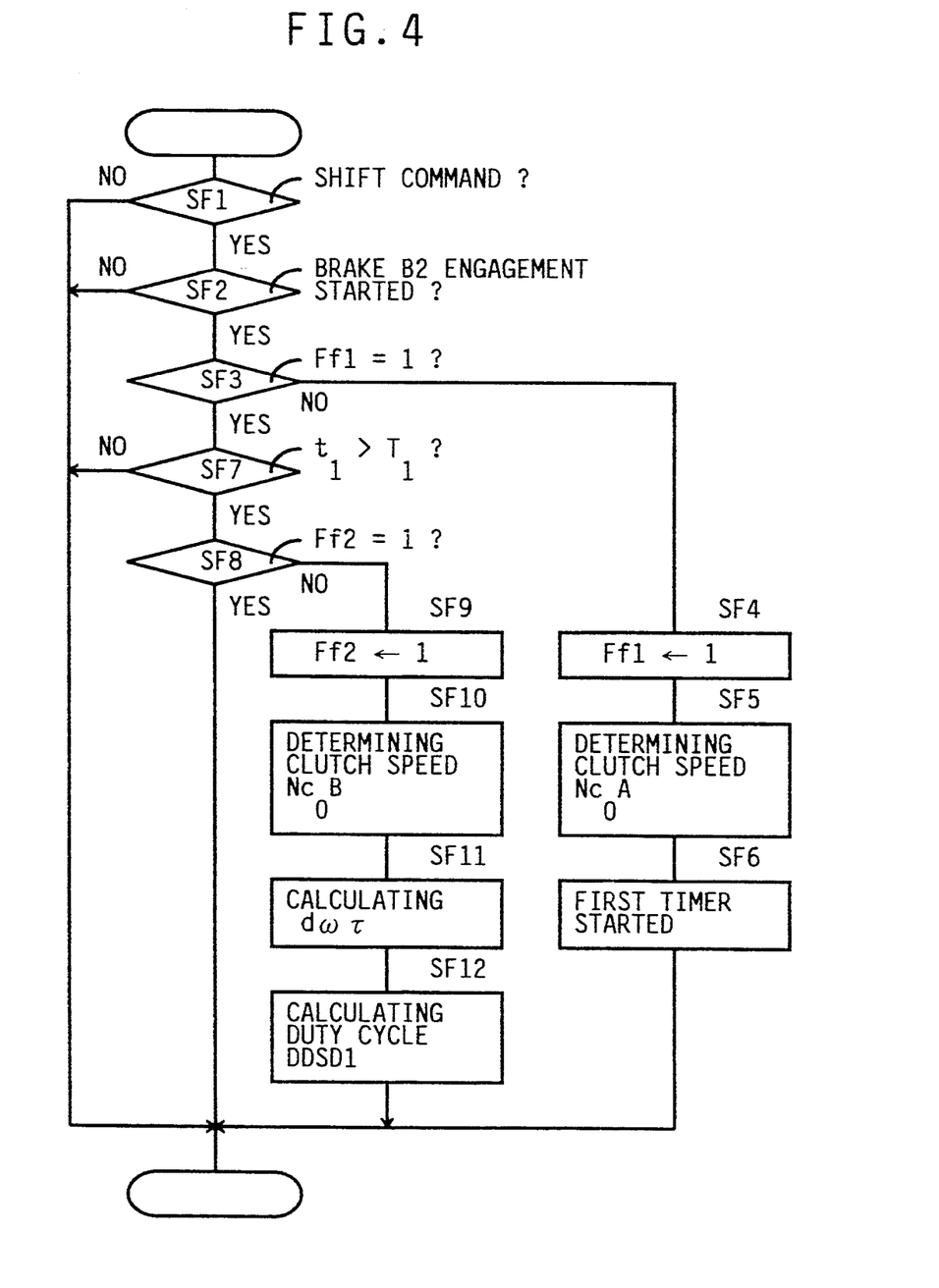
FIG. 4 is a flow chart illustrating a control routine executed by a controller for determining the duty cycle of a solenoid-operated control valve for controlling the back pressure of an accumulator for a brake of the transmission.
Figure 6:
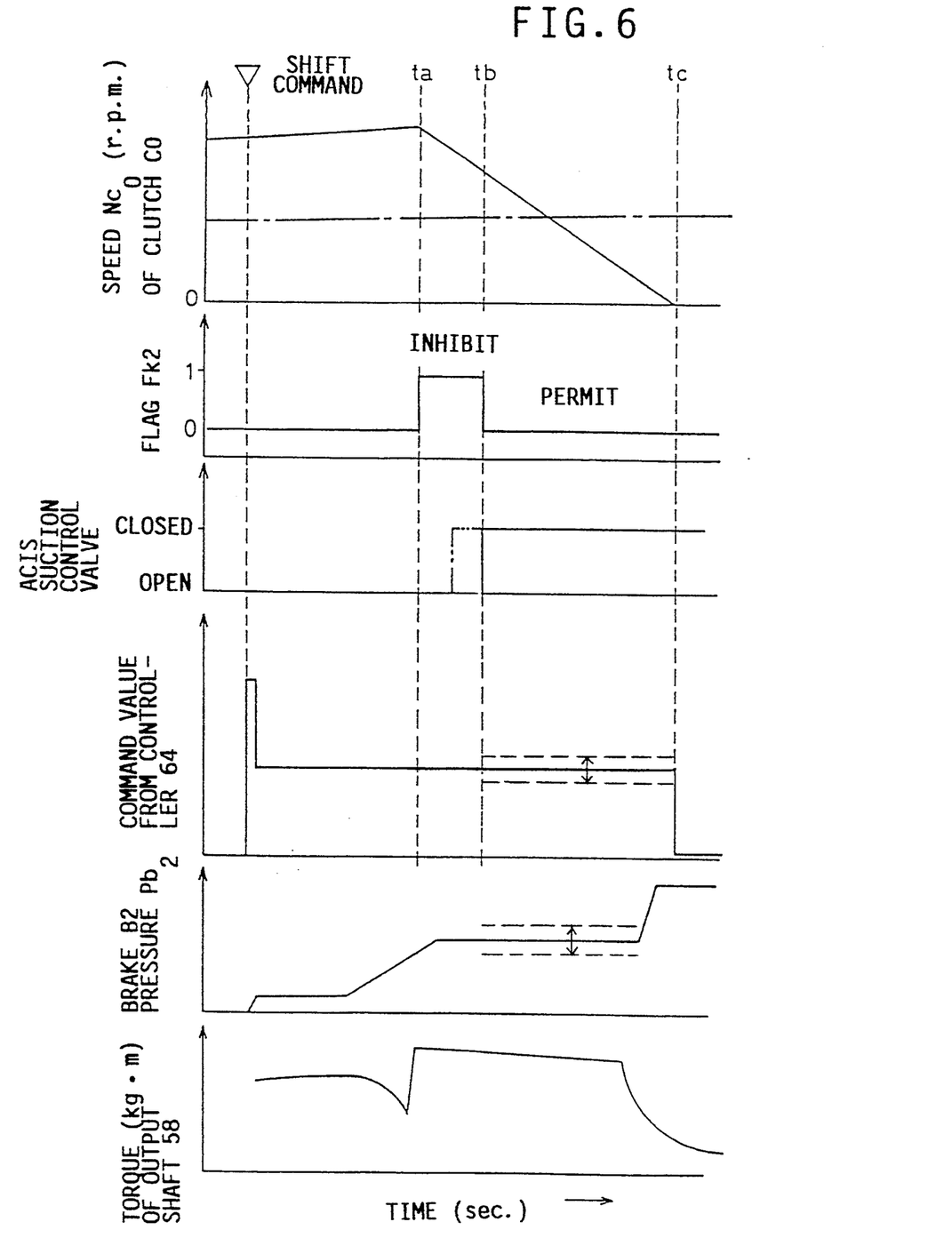
FIG. 6 is a graph indicating changes in various parameters during an engaging action of the brake controlled according to the routine of FIG. 4.

Reference is first made to the flow chart of FIG. 4 illustrating the control routine adapted to regulate the back pressure PA of the accumulator 72 for thereby controlling the hydraulic pressure $Pb_2$ to be applied to the brake B2 during an engaging action thereof for shifting up the automatic transmission 12 from the 1st-speed position to the 2nd-speed position. The control routine is initiated with step SF1 to determine whether or not the command for shifting up the transmission 12 from the 1st-speed position to the 2nd-speed position has been received from the controller 64. If a negative decision (NO) is obtained in step SF1, one cycle of execution of this control routine is terminated. If an affirmative decision (YES) is obtained in step SF1, the control flow goes to step SF2 to determine whether or not the engaging action of the brake B2 has been started. The start of the engaging action is determined by detecting the commencement of reduction in the rotating speed $Nc_0$ of the clutch C0. This commencement is indicated at "ta" in the graph of FIG. 6. If a negative decision (NO) is obtained in step SF2, one cycle of execution of the control routine is terminated. If an affirmative decision (YES) is obtained in step SF2, step SF3 is implemented to determine whether or not a flag Ff1 is set at "1", which indicates that the rotating speed $Nc_0A$ of the clutch C0 upon commencement of the engaging action of the brake B2 has been determined.

Immediately after the command for the shifting to the 2nd-speed position has been received, the reduction in the speed $Nc_0$ has not been commenced and the speed $Nc_0A$ has not been determined, whereby a negative decision (NO) is obtained in step SF3, and step SF4 is implemented to set the flag Ff1 to "1". Step SF4 is followed by step SF5 in which a rotating speed $Nc_0A$ of the clutch C0 at the time of commencement of the engaging action of the brake B2 is determined on the basis of the INPUT SPEED signal SNin. Then, the control flow goes to step SF6 to start a first timer, and thus one cycle of execution of the control routine is terminated. The first timer functions to measure a lapse of time t1.

In the next cycle, an affirmative decision (YES) is obtained in step SF3, since the flag Ff1 has been set to "1" in step SF4 in the preceding cycle. Consequently, the control flow goes to step SF7 to determine whether the time t1 measured by the first timer has exceeded a preset threshold T1, which may be about 100ms., for example. Immediately after the start of the first timer, a negative decision (NO) is obtained in step SF7, and one cycle of execution of the control routine is terminated.

With the control routine repeatedly implemented, the time count t1 exceeds the threshold T1, and an affirmative decision (YES) is obtained in step SF7. As a result, step SF8 is implemented to determine whether or not a flag Ff2 is set at "1", which indicates that a rotating speed $Nc_0B$ of the clutch C0 the preset time T1 after the commencement (point of time "ta") of the engaging action of the brake B2 has been determined. The lapse of the present time T1 from the point of time "ta" is indicated at "tb" in FIG. 7.

Immediately after the affirmative decision (YES) is obtained for the first time in step SF7, a negative decision (NO) is obtained in step SF7, whereby step SF9 is implemented to set the flag Ff2 to "1". Step SF9 is followed by step SF10 to determine the speed $Nc_0B$ of the clutch C0 on the basis of the INPUT SPEED signal SNin. Step SF11 is then implemented to calculate a rate of change $d\omega\tau$ in the rotating speed $Nc_0$ during the preset time interval T1. Step SF11 is followed by step SF12 in which the duty cycle (duty ratio) DSSD1 of the solenoid-operated shut-off valve S6 is calculated according to the following equation:

$$DSSD1 = DSSD1 + (d\omega\tau - d\omega\tau_0) \times DSSD1B$$

where,
  $d\omega\tau$: calculated actual rate of change of $Nc_0$
  $d\omega\tau_0$: target rate of change of $Nc_0$
  DSSD1B: compensating coefficient It will be understood from the above equation that the duty cycle DSSD1 for engaging the brake B2 in response to the present shift command is calculated by adding a product of a difference or error $(d\omega\tau - d\omega\tau_0)$ and the compensating coefficient DSSD1B, to the duty cycle which was used in the last engaging action of the brake B2 in response to the last shift command and which is stored in the RAM 156. The calculated duty cycle DSSD1 is stored in the RAM 156, for use for the next shift command or the next engaging action of the brake B2. Thus, the duty cycle DSSD1 stored in the RAM 156 is updated. The flags Ff1 and Ff2 are reset to "0" when the engaging action of the brake B2 (shifting action of the transmission 12) is completed.

According to the above equation, the duty cycle DSSD1 is increased to lower the duty-controlled pressure PS, when the actual rate of change $d\omega\tau$ detected during the initial period between "ta" and "tb" of the engaging action of the brake B2 is higher than the target value $d\omega\tau_0$. In this case, therefore, the torque transmitting capacity of the brake B2 is reduced, and the rate of reduction in the speed $Nc_0$ of the clutch C0 is accordingly lowered. When the detected rate of change $d\omega\tau$ is lower than the target value $d\omega\tau_0$, on the other hand, the duty cycle DSSD1 is decreased to increase the duty-controlled pressure PS, whereby the torque transmitting capacity of the brake B2 is increased, and the rate of reduction in the speed $Nc_0$ is accordingly increased. It will therefore be understood that the above equation is formulated to regulate, in the feedback fashion, the back pressure PA of the accumulator 72 and thereby control the hydraulic pressure $Pb_2$ applied to the brake B2 such that the actual rate of change $d\omega\tau$ in the speed $Nc_0$ of the clutch C0 during the engaging action of the brake B2 coincides with the target value $d\omega\tau_0$, namely, such that the difference or error $(d\omega\tau - d\omega\tau_0)$ during the initial period between "ta" and "tb" is zeroed. A command value $(=1/DSSD1)$ applied from the controller 64 to the solenoid of the shut-off valve S6 during the following period between "tb" and "tc" is determined on the basis of the calculated duty cycle DSSD1. This command value changes depending upon the above difference or error $(d\omega\tau - d\omega\tau_0)$, within a certain range as indicated by two dashed lines in FIG. 7, whereby the hydraulic pressure $Pb_2$ applied to the brake B2 during the period between "tb" and "tc" is changed depending upon the above error $(d\omega\tau - d\omega\tau_0)$, so as to assure consistent shifting characteristic of the transmission 12 upon all occurrences of the same shifting (e.g., from the 1st-speed position to the 2nd-speed position, as in the present example) with substantially the same amount of operation of the accelerator pedal 142, irrespective of variations in the engine torque and friction coefficient of the frictional coupling device (e.g., brake B2), and chronological changes of the engine and frictional coupling device.

Figure 5:
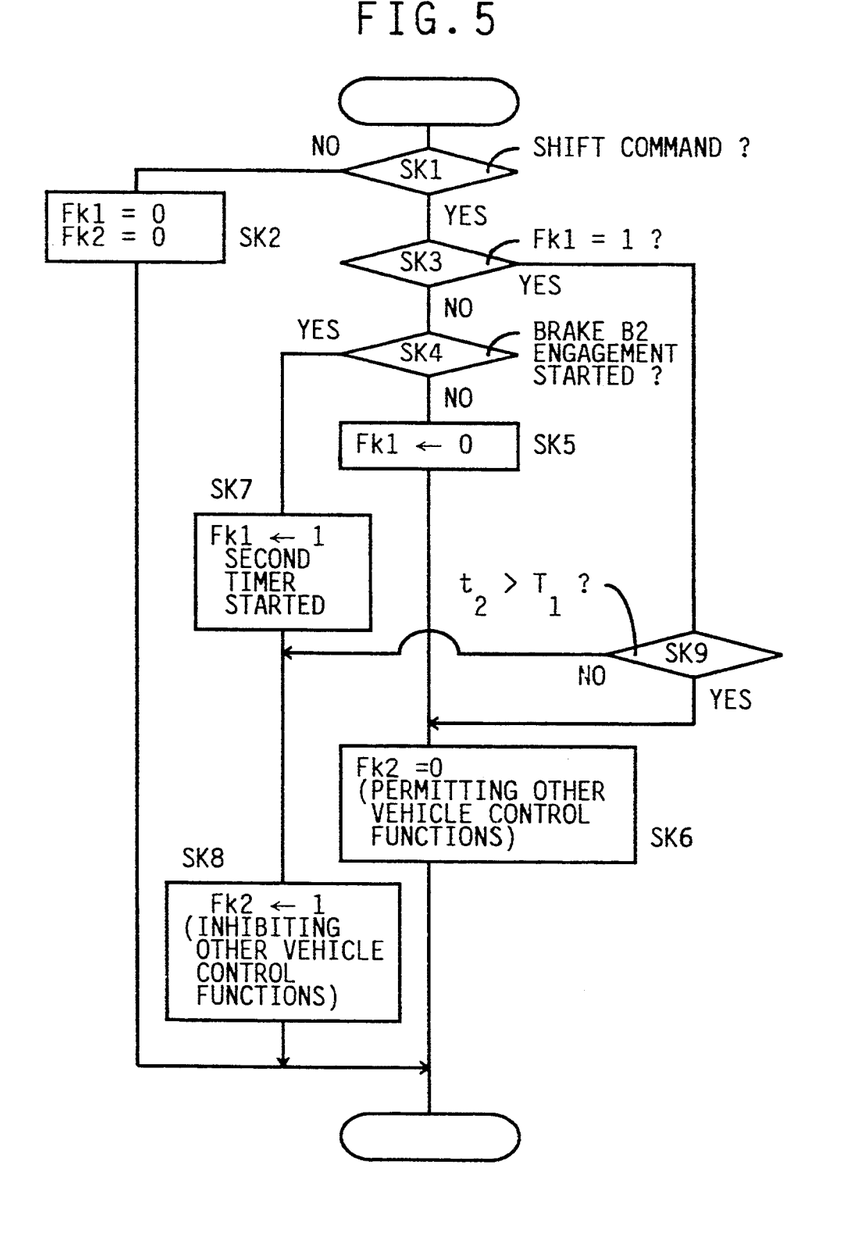
FIG. 5 is a flow chart illustrating a control routine executed by the controller for permitting and inhibiting the execution of vehicle control functions which influence the shifting operation of the transmission.

Reference is now made to the flow chart of FIG. 5 illustrating the control routine for inhibiting the execution of vehicle control functions that influence the detected rate of change $d\omega_T$ in the speed $N_{C0}$ of the clutch C0, during the initial period between "ta" and "tb" of the engaging action of the brake B2. The control routine of FIG. 5 is started with step SK1 to determine whether or not the shift command for shifting the transmission 12 from the 1st-speed position to the 2nd-speed position has been generated. If a negative decision (NO) is obtained in step SK1, the control flow goes to step SK2 in which flags Fk1 and Fk2 are reset to "0". The flag Fk1 set at "1" indicates that the engaging action of the brake B2 has been started $d\omega_T$ while the flag Fk2 set at "1" indicates that specific vehicle control functions that influence the detected rate of change $d\omega_T$ are inhibited, as described below. If an affirmative decision (YES) is obtained in step SK1, step SK3 is implemented to determine whether or not the flag Fk1 is set at "1". During an initial period of the shifting action of the transmission 12, a negative decision (NO) is obtained in step SK3, and step SK4 is implemented to determine whether or not the engaging action of the brake B2 has been started. This step SK4 is similar to the step SF2 in the control routine of FIG. 4.

If a negative decision (NO) is obtained in step SK4, the control flow goes to step SK5 in which the flag Fk1 is reset to "0". Step SK5 is followed by step SK6 in which the flag Fk2 is also reset to "0", to permit in the control routine of FIG. 7 the execution of the specific vehicle control functions such as the ACIS control function (for controlling the suction control valve of an inertia supercharging engine) and TRC control function (for the drive force of the drive wheels) indicated above, and an EFI control function (for controlling the amount of fuel injection), and a function for controlling the supercharger of the engine.

After the present control routine is repeatedly executed, the engaging action of the brake B2 is started, and an affirmative decision (YES) is obtained in step SK4, and the control flow goes to step SK7 to set the flag Fk1 to "1" and start a second timer to measure a time lapse t2. Then, step SK8 is implemented to set the flag Fk2 to "1", to inhibit in the control routine of FIG. 7 the execution of the specific vehicle control functions that influence the detected rate of change $d\omega_T$ of the speed $N_{C0}$ of the clutch C0. In the next cycle of execution of the control routine, an affirmative decision (YES) is obtained in step SK3, and step SK9 is implemented to determine whether or not the time lapse t2 measured by the second timer has exceeded the present threshold T1. As long as the time lapse t2 is shorter than the preset time T1, a negative decision (NO) is obtained in step SK9, and step SK8 is implemented whereby the execution of the specific vehicle control functions in the control routine of FIG. 7 is continuously inhibited. That is, the specific vehicle control functions are not executed during the initial period between "ta" and "tb" of the engaging action of the brake B2, namely, while the rate of change $d\omega_T$ is being detected. When the time lapse t2 has exceeded the present time T1, an affirmative decision (YES) is obtained in step SK9, and the control flow goes to step SK6 to reset the flag Fk2 to "0", so that the execution of the specific vehicle control functions during the following period between "tb" and "tc" is permitted.

As described above, the control routine of FIG. 7 is adapted to execute the specific vehicle control functions when the flag Fk2 is set at "0", and inhibit the execution of these control functions when the flag Fk2 is set at "1".

It will be understood from the above explanation that steps SF3 through SF11 correspond to detector means for detecting the rate of change $d\omega_T$ in the speed $N_{C0}$ of the clutch C0, while step SK8 corresponds to inhibiting means for inhibiting the execution of the specific vehicle control functions that influences the detected rate of change $d\omega_T$, while the detector means is detecting the rate of change, namely, during the period between "ta" at which the engagement of the brake B2 is started, and "tb" which is the present time T1 after the point of time "ta". This arrangement prevents an error or noise which would otherwise be included in the detected rate of change $d\omega_T$, which is compared with the target value $d\omega_T 0$, to control the hydraulic pressure $P_{b2}$ on the basis of the difference or error ($d\omega_T - d\omega_{T0}$). Thus, the present arrangement assures improved consistency in the shifting characteristics of the automatic transmission 12, giving the vehicle driver enhanced driving comfort owing to improved stability and smoothness of shifting of the transmission.

In the conventional shift control apparatus for an automatic transmission, vehicle control functions such as the ACIS control function are executed during the initial period between "ta" and "tb" of the engaging action of the brake B2, whereby the rate of change $d\omega_T$ detected during that period tends to be influenced by the execution of such vehicle control functions, resulting in inconsistent regulation of the back pressure of the accumulator 72, which leads to different shifting characteristics of the transmission upon occurrences of the same shifting action (i.e., from the 1st-speed position to the 2nd-speed position in the illustrated example). For instance, the suction control valve is brought to the closed position during the period between "ta" and "tb" (during detection of the rate of change $d\omega_T$), as indicated in one-dot chain line in FIG. 6, if the ACIS control function is executed.

While the present invention has been described in the presently preferred embodiment, it is to be understood that the invention is not limited to the details of the illustrated embodiment, but may be otherwise embodied.

In the illustrated embodiment, the principle of the present invention is applied to the brake B2 which is engaged when the transmission 12 is shifted up from the 1st-speed position to the 2nd-speed position. However, the invention is equally applicable to other frictional coupling devices for other shifting actions.

Although the rate of change $d\omega_T$ in the speed $N_{C0}$ of the clutch C0 is used as the parameter which indicates the progress or condition of a shifting action of the transmission 12, the rate of change $d\omega_T$ may be replaced by other parameters such as the rate of change in the speed of the clutch C2; rate of change in the speed of the engine 10; rate of change in the speed Nout of the output shaft 58 of the transmission 12; and rate of change in the output torque of the transmission 12.

While the same preset time T1 is used as a threshold to be compared with the time lapses t1 and t2 measured by the first and second timers (used in the control routines of FIGS. 4 and 5, respectively), different threshold values may be used for the two timers. For instance, the threshold for the second timer may be larger than that for the first timer.

In the illustrated embodiment, the back pressure PA for controlling the hydraulic pressure $Pb_2$ to be applied to the brake B2 is controlled by a combination of the duty-controlled solenoid-operated shut-off valve S6 and the damper 76, the shut-off valve S6 and the damper 76 may be replaced by a linear solenoid valve which is adapted to change the back pressure PA continuously with the electric current applied thereto from the controller 64.

The automatic transmission 12 has the four forward drive positions, the principle of the invention is applicable to an automatic transmission having hydraulically operated frictional coupling devices capable of establishing five or more forward drive positions.

It is to be understood that the present invention may be embodied with various other changes, modifications and improvements, which may occur to those skilled in the art, without departing from the spirit and scope of the invention defined in the following claims.

What is claimed is:

1. A control apparatus for controlling a hydraulic pressure to be applied to a hydraulically operated frictional coupling device of an automatic transmission for a motor vehicle, for an engaging action of the hydraulically operated frictional coupling device to establish a given operating position of the automatic transmission, said control apparatus comprising:

detector means for detecting a rate of change in a parameter indicative of a progress of said engaging action;

pressure control means for regulating said hydraulic pressure so that the rate of change in said parameter detected by said detector means changes towards a target value; and inhibiting means for inhibiting execution of a control function which controls the vehicle, while said detector means is detecting said rate of change in said parameter, where the execution of said control function influences the detected rate of change in said parameter.

2. A control apparatus according to claim 1, wherein said detector means includes a parameter sensor for detecting said parameter.

3. A control apparatus according to claim 2, wherein said automatic transmission is shifted to said given operating position upon generation of a shift command, and said detector means further includes determining means for determining a first and a second value of said parameter from respective output values of said parameter sensor obtained at a first and a second point of time, respectively, after the generation of said shift command, said detector means further including calculating means for calculating from said first and second values a rate of change in said parameter during a period between said first and second points of time, said inhibiting means inhibiting the execution of said control function during a time duration including said period.

4. A control apparatus according to claim 3, wherein said time duration is the same as said period.

5. A control apparatus according to claim 4, wherein said inhibiting device includes means for detecting said first point of time, and means for measuring said time duration.

6. A control apparatus according to claim 2, wherein said parameter sensor comprises a speed sensor for detecting as said parameter a rotating speed of a rotary member of said automatic transmission.

7. A control apparatus according to claim 6, wherein said rotary member is a frictional coupling device different from said hydraulically operated frictional coupling device whose hydraulic pressure is controlled.

8. A control apparatus according to claim 6, wherein said automatic transmission is shifted to said given operating position upon generation of a shift command, and said detector means further includes determining means for determining a first and a second value of said rotating speed of said rotary member from respective output values of said speed sensor obtained at a first and a second point of time, respectively, after the generation of said shift command, said detector means further including calculating means for calculating from said first and second values a rate of change in the rotating speed of said rotary member during a period between said first and second points of time, said inhibiting means inhibiting the execution of said control function during at least said period.

9. A control apparatus according to claim 8, wherein said engaging action of said hydraulically operated frictional coupling device is started at said first point of time, said second point of time being a preset time after said first point of time.

10. A control apparatus according to claim 8, further comprising means for detecting said first point of time, and time measuring means for measuring said present time after said first point of time to detect said second point of time.

11. A control apparatus according to claim 1, wherein said pressure control means includes an accumulator having a piston, said pressure control means regulating said hydraulic pressure to be applied to said hydraulically operated frictional coupling device, by controlling a back pressure which acts on said piston of said accumulator.

12. A control apparatus according to claim 11, wherein said pressure control means further includes a solenoid-operated control valve which generates a duty-controlled pressure which influences said back pressure, said pressure control means further including duty control means for controlling a duty cycle of said solenoid-operated control valve to thereby change said duty-controlled pressure.

13. A control apparatus according to claim 12, wherein said pressure control means further includes means for determining said duty cycle of said solenoid-operated control valve, on the basis of a difference between said rate of change detected by said detector means and said target value.

14. A control apparatus according to claim 1, wherein vehicle has an inertia supercharging type engine provided with a suction control valve, and said inhibiting means inhibits a closing action of said suction control valve while said detector means is detecting said rate of change in said parameter.

15. A control apparatus according according to claim 7, wherein said automatic transmission comprises an output shaft, a first planetary gear assembly connected to said output shaft, a second planetary gear assembly connected to said first planetary gear assembly, and an input shaft connected to said second planetary gear assembly, said first planetary gear assembly including said hydraulically operated frictional coupling device whose hydraulic pressure is controlled, said second planetary gear assembly including said rotary member whose rotating speed is detected by said speed sensor.

16. A control apparatus according to claim 15, wherein said hydraulically operated frictional coupling device of said first planetary gear assembly consists of a brake for fixing a rotary member of said first planetary gear assembly to a housing of said first planetary gear assembly, said rotary member of said second planetary gear assembly consisting of a clutch.

* * * * *